(12) United States Patent
Park et al.

(10) Patent No.: US 9,012,780 B2
(45) Date of Patent: Apr. 21, 2015

(54) 3-COAXIAL SUPERCONDUCTING POWER CABLE AND CABLE'S STRUCTURE

(71) Applicant: UIDUK University Industry—Academic Cooperation Foundation, Gyeongju-si, Gyeongsangbuk-do (KR)

(72) Inventors: Min Won Park, Gimhae-si (KR); In Keun Yu, Changwon-si (KR); Sang Jin Lee, Pohang-si (KR); Sung Kyu Kim, Changwon-si (KR); Sun Kyoung Ha, Gyeongju-si (KR)

(73) Assignee: UIDUK University—Academic Coorportion Foundation, Gyeongju-si (KR)

( * ) Notice: Subject to any disclaimer, the term of this patent is extended or adjusted under 35 U.S.C. 154(b) by 57 days.

(21) Appl. No.: 13/939,726

(22) Filed: Jul. 11, 2013

(65) Prior Publication Data

US 2015/0014019 A1    Jan. 15, 2015

(51) Int. Cl.
*H01B 12/02* (2006.01)
*H01B 9/04* (2006.01)

(52) U.S. Cl.
CPC . *H01B 12/02* (2013.01); *H01B 9/04* (2013.01)

(58) Field of Classification Search
USPC .............. 174/125.1, 113 R; 505/230, 231
See application file for complete search history.

(56) References Cited

U.S. PATENT DOCUMENTS 7,743,485 B1 *   6/2010   Fujikami ................. 29/599
2012/0214675 A1 *   8/2012   van der Laan ........... 505/230

FOREIGN PATENT DOCUMENTS

| JP | 2001-035272 A | 2/2001 |
| JP | 2004-537828 A | 12/2004 |
| KR | 10-2005-0112000 A | 11/2005 |

* cited by examiner

*Primary Examiner* — Hoa C Nguyen
*Assistant Examiner* — Amol Patel
(74) *Attorney, Agent, or Firm* — Sughrue Mion, PLLC

(57) ABSTRACT

Provided are a three-phase coaxial superconducting power cable and a structure thereof. A certain space is formed between adjacent superconducting wires of a superconducting layer (disposed at an outer portion) having more superconducting wires among a plurality of superconducting layers, and another wire is disposed in the space, or the superconducting wires of the respective superconducting layers are disposed to have different critical currents. Accordingly, a waste of superconducting wires is prevented, and the optimized three-phase coaxial superconducting power cable is provided.

3 Claims, 2 Drawing Sheets (a)  (b)

(a)

(b)

3-COAXIAL SUPERCONDUCTING POWER CABLE AND CABLE'S STRUCTURE

TECHNICAL FIELD

The present invention relates to a three-phase coaxial superconducting power cable and a structure thereof, and more particularly, to a three-phase coaxial superconducting power cable and a structure thereof in which superconducting wires included in a superconducting layer are formed of wires having different critical currents, thus preventing a waste of wires and optimizing a critical current of each phase.

BACKGROUND

A three-phase coaxial superconducting power cable denotes a superconducting cable that has a structure in which three superconducting layers form a layer with respect to one axis, and includes an electricity insulating layer formed of an electricity insulating material between adjacent superconducting layers. The three-phase coaxial superconducting power cable reduces the number of wires by about half compared to other superconducting cables of the related art, and decreases the number of used insulating papers by about two-third of a three-phase batch type, thus reducing a diameter of a core to enable an economical and compact superconducting power cable to be realized.

Moreover, since a vector sum of a three-phase current is close to 0 and a current flowing in a shield layer is low, the three-phase coaxial superconducting power cable does not include a superconducting shield layer winding, and includes a shield layer formed of copper which surrounds all of three phases externally. Also, since a three-phase combination process is unnecessary, a manufacturing process is simplified, thus greatly reducing the manufacturing cost.

FIG. 1 illustrates a structure of a related art three-phase coaxial superconducting power cable. The related art three-phase coaxial superconducting power cable includes a superconducting layer 100, an electricity insulating layer 110, a copper shield layer 120, and a cryo-chamber 130.

The superconducting layer 100 is provided as three, and has a structure in which a layer is formed with respect to one axis. The superconducting layer 100 includes a superconducting wire, and a current flows through the superconducting wire. When an input current is lower than a critical current, the superconducting wire shows a superconducting characteristic in which a resistance is 0, but when the input current is higher than the critical current, the superconducting characteristic is broken. The electricity insulating layer 110 is disposed between adjacent superconducting layers 100, and filled with an insulating material for insulation.

In the related art three-phase coaxial superconducting power cable, when a high voltage flows in each of the superconducting layers 100, the electricity insulating layer 110 becomes thicker, and for this reason, a radius difference between the superconducting layers 100 enlarges. Also, since each of the superconducting layers 100 has a superconducting wire to be suitable for a circumference, the numbers of superconducting wires of respective phases differ. For this reason, the respective phases have different critical currents, and moreover a waste of superconducting wires occurs in an outer layer.

SUMMARY

Accordingly, the present invention provides a three-phase coaxial superconducting power cable in which a certain space is formed in an outer layer including rather more superconducting wires among a plurality of superconducting layers, and another wire is disposed in the space, thus preventing a waste of superconducting wires and enabling critical currents of respective phases to have similar values.

The present invention also provides a three-phase coaxial superconducting power cable in which a copper shield layer of a related art three-phase coaxial superconducting power cable is removed, and a cryo-chamber formed of aluminum acts as the shield layer.

In one general aspect, a structure of a superconducting cable, in which a plurality of superconducting layers and a plurality of electricity insulating layers form a layer with respect to one axis, includes: each of the electricity insulating layers is disposed between adjacent superconducting layers, and in at least one superconducting layer other than an outermost layer among the plurality of superconducting layers, a space is formed between adjacent superconducting wires, and a wire having a critical current different from the supper conducting wires is disposed in the space. Each of the plurality of superconducting layers may be formed of a superconducting wire having a critical current different from a superconducting wire included in other superconducting layer.

In another general aspect, a superconducting cable including: a first superconducting layer formed of a superconducting wire having a first critical current; a second superconducting layer formed of a superconducting wire having a second critical current, and disposed outside the first superconducting layer to form a circle along with the first superconducting layer with respect to one axis; a third superconducting layer formed of a superconducting wire having a third critical current, and disposed outside the second superconducting layer to form a circle along with the first superconducting layer with respect to one axis; and an electricity insulating layer formed of an electricity insulating material, and disposed between the first and second superconducting layers and between the second and third superconducting layers, wherein the first to third critical currents differ.

Other features and aspects will be apparent from the following detailed description, the drawings, and the claims.

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Hereinafter, embodiments of the present invention will be described in detail with reference to the accompanying drawings.

Figure 1:
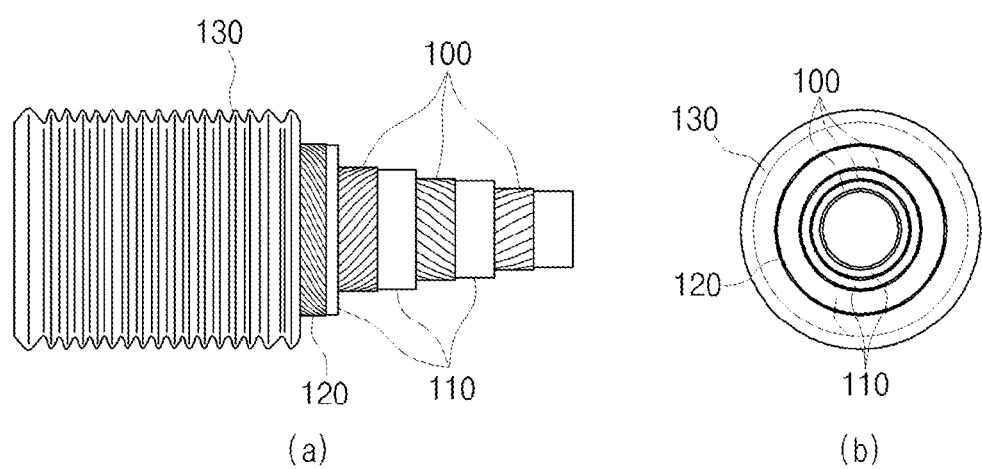
FIG. 1 is views illustrating a structure of a related art three-phase coaxial superconducting power cable.
Figure 2:
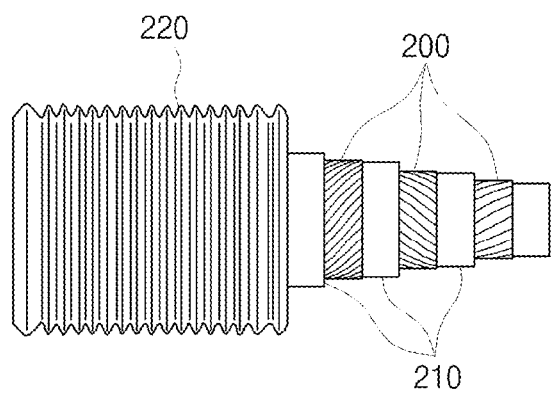
FIG. 2 is views illustrating a structure of a three-phase coaxial superconducting power cable according to an embodiment of the present invention.
Figure 2:
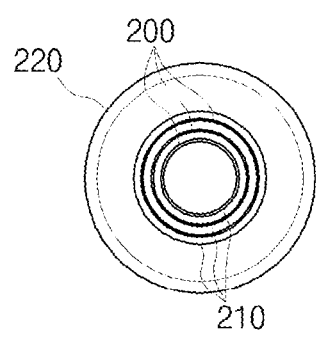

FIG. 2 is views illustrating a structure of a three-phase coaxial superconducting power cable according to an embodiment of the present invention.

The three-phase coaxial superconducting power cable according to an embodiment of the present invention includes a superconducting layer 200, an electricity insulating layer 210, and a cryo-chamber 220.

In comparison with the related art, the present invention has a feature in configuration of a wire of the superconducting layer 200. In the present invention, a space is formed between superconducting wires of an outer layer among a plurality of the superconducting layers 200, and wound with another wire. Here, the other wire may be a general wire, or may be a superconducting wire having a different critical current.

The wires are connected to each other in parallel, and thus, a current flows toward only a superconducting wire having a low resistance. Accordingly, critical currents of respective phases become similar, a waste of the superconducting wires is reduced, and shaking of the wires or a change of a winding pitch angle is prevented.

According to another embodiment of the present invention, a method is proposed in which a superconducting wiring of each of the superconducting layers 200 is wound with a wire having a different critical current. Such a method is a method that, when the number of wires to wind is predetermined for each layer, selects a critical current of each superconducting wire according to a critical current of a cable.

The critical current of each superconducting wire is decided based on a thickness or density of each wire, and critical currents of superconducting wires by manufacturer are shown in Table 1.

TABLE 1

| | Critical Current | | |
|---|---|---|---|
| | A Company | B Company | C Company |
| Provided Specification | 62.0 A | 105-140 A | 85.0 A |
| Measured Result | 44.5 A | 128.5 A | 76.1 A |

The number of superconducting wires increases progressively closer to an outer superconducting layer 200, and thus, superconducting wires having a low critical current are provided in an outer layer. Accordingly, the critical currents of the respective superconducting layers 200 become similar, and the material cost can be reduced.

Moreover, a method is proposed in which a copper shield layer of the related art three-phase coaxial superconducting power cable is removed, and the cryo-chamber 220 formed of aluminum acts as the shield layer. Such a method removes the unnecessary copper shield layer, and thus can reduce the material cost and shorten a process time. Also, since the shield layer surrounding three phases are removed, a cooling efficiency can increase.

As described above, a certain space is formed in a superconducting layer disposed at an outer portion among the plurality of superconducting layers of the three-phase coaxial superconducting power cable, and wound with a wire of a different material, thus providing the optimized three-phase coaxial superconducting power cable.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A structure of a superconducting cable in which a plurality of superconducting layers and a plurality of electricity insulating layers form a layer with respect to one axis, wherein
   each of the electricity insulating layers is disposed between adjacent superconducting layers, and
   in at least one superconducting layer other than an outermost layer among the plurality of superconducting layers, a space is formed between adjacent superconducting wires, and a wire having a critical current different from the superconducting wires is disposed in the space,
   wherein each of the plurality of superconducting layers is formed of a superconducting wire having a critical current different from a superconducting wire comprised in other superconducting layer.

2. A superconducting cable comprising:
   a first superconducting layer formed of a superconducting wire having a first critical current;
   a second superconducting layer formed of a superconducting wire having a second critical current, and disposed outside the first superconducting layer to form a circle along with the first superconducting layer with respect to one axis;
   a third superconducting layer formed of a superconducting wire having a third critical current, and disposed outside the second superconducting layer to form a circle along with the first superconducting layer with respect to one axis; and
   an electricity insulating layer formed of an electricity insulating material, and disposed between the first and second superconducting layers and between the second and third superconducting layers,
   wherein the first to third critical currents differ.

3. The superconducting cable of claim 2, further comprising a cryo-chamber formed of aluminum, and configured to act as a superconducting shield layer and protect the first to third superconductor layers and the electricity insulating layer.

* * * * *